(12) United States Patent
Pieper

(10) Patent No.: US 6,997,780 B2
(45) Date of Patent: Feb. 14, 2006

(54) METHOD AND DEVICE FOR SANDBLASTING, ESPECIALLY REMOVING IN A PRECISE MANNER AND/OR COMPACTING AND/OR COATING SOLID SURFACES

(75) Inventor: Gerard Pieper, Lübbenau (DE)

(73) Assignee: Pieper Innovationsgesellschaft mbH, Lubbenau (DE)

(*) Notice: Subject to any disclaimer, the term of this patent is extended or adjusted under 35 U.S.C. 154(b) by 41 days.

(21) Appl. No.: 10/470,178

(22) PCT Filed: Jan. 22, 2002

(86) PCT No.: PCT/DE02/00252

§ 371 (c)(1),
(2), (4) Date: Jul. 22, 2003

(87) PCT Pub. No.: WO02/058887

PCT Pub. Date: Aug. 1, 2002

(65) Prior Publication Data

US 2004/0053561 A1 Mar. 18, 2004

(30) Foreign Application Priority Data

Jan. 23, 2001 (DE) .......................... 101 02 924

(51) Int. Cl.
*B24C 1/00* (2006.01)
*B24C 3/16* (2006.01)
*B24C 5/04* (2006.01)

(52) U.S. Cl. ..................... 451/38; 451/99; 451/102
(58) Field of Classification Search ............. 451/38–40, 451/75, 99–102
See application file for complete search history.

(56) References Cited

U.S. PATENT DOCUMENTS 2,770,924 A  11/1956 Mead et al.

(Continued)

FOREIGN PATENT DOCUMENTS

CA  1 200 391  2/1986

(Continued)

*Primary Examiner*—David B. Thomas
(74) *Attorney, Agent, or Firm*—Herbert Dubno

(57) ABSTRACT

The invention relates to a method and device for sandblasting, especially removing in a precise manner and/or compacting and/or coating solid surfaces, such as removing defective spots of paint from coats of lacquer, smoothing out soldered and welded joints, removal of contaminated concrete coatings or rust coatings, hardening, planing or coating metal surfaces, wherein a sandblasting agent is added by means of gravity and/or due to the effect of an injector to a carrier air flow produced by an underpressure, conveyed in a flexible hose- line system (13) to a jet lance (14) before being guided via a processing surface subject to low pressure by a sandblasting chamber, whereupon it is returned in the air flow, purified and returned to the circuit, whereby acceleration of the sandblasting agent is produced by the low pressure and the sandblasting chamber is displaced from one processing surface to another. The aim of the invention is to increase the sandblasting speed in a significant manner while at the same time economically adjusting the amount of power furnished to the processing surface for various wide-ranging fields of application using as little power as possible yet providing high flexibility and ecologically compatible recovery and reutilization of the sandblasting means. In order to achieve this, the sandblasting agent receives at least one additional energy pulse from a gas flow which is placed at least under atmospheric pressure and suctioned by the low pressure in order to reach a final speed which is significantly greater than the speed of the carrier air flow downstream from the area where dosing occurs. The final speed makes it possible to adjust the amount of power applied to the surface to be processed according to the following parameters: type and forms of the surface to be processed and the sandblasting agent, degree in which the carrier air flow is charged with the sandblasting agent, low pressure in the carrier air flow, and time and temperature of sandblasting.

28 Claims, 7 Drawing Sheets

U.S. PATENT DOCUMENTS

| | | | |
|---|---|---|---|
| 4,669,230 A * | 6/1987 | Suzuki et al. | 451/2 |
| 4,878,320 A * | 11/1989 | Woodson | 451/39 |
| 5,097,633 A * | 3/1992 | Branton et al. | 451/5 |
| 5,317,841 A * | 6/1994 | Cook et al. | 451/40 |
| 5,556,325 A * | 9/1996 | Shank, Jr. | 451/101 |
| 5,667,430 A * | 9/1997 | McPhee et al. | 451/87 |
| 5,709,590 A * | 1/1998 | McPhee et al. | 451/87 |
| 5,779,523 A * | 7/1998 | Mesher | 451/93 |
| 5,947,800 A * | 9/1999 | Fring | 451/99 |
| 6,193,589 B1 * | 2/2001 | Khalaj | 451/102 |
| 6,238,275 B1 * | 5/2001 | Metcalf et al. | 451/87 |
| 6,250,996 B1 * | 6/2001 | Metcalf et al. | 451/87 |
| 6,390,898 B1 * | 5/2002 | Pieper | 451/75 |

FOREIGN PATENT DOCUMENTS

| | | |
|---|---|---|
| CH | 329835 | 6/1958 |
| DE | 196 14 555 | 10/1997 |
| DE | 197 47 838 | 4/1999 |
| DE | 101 02 924 | 6/2002 |
| EP | 0 511 636 | 11/1992 |
| NL | 9400371 | 10/1995 |

* cited by examiner

METHOD AND DEVICE FOR SANDBLASTING, ESPECIALLY REMOVING IN A PRECISE MANNER AND/OR COMPACTING AND/OR COATING SOLID SURFACES

CROSS REFERENCE TO RELATED APPLICATIONS

This application is the US national stage of PCT/DE02/00252 filed 22 Jan. 2002 and based upon German national application 10102924.1 itself filed 23 Jan. 2001 under the International Convention.

FIELD OF THE INVENTION

The invention relates to a method for sandblasting of solid surfaces, especially for exact-shape removal and/or compaction and/or coating, for example, the removal of paint from defective paint locations, for the smoothing of solder and weld seams, for the removal of contaminated concrete layers or rust layers, for the hardening or leveling of metal surfaces, in which a blast medium is metered into a carrier air stream produced by suction by means of gravity and/or an injection effect, is supplied by a flexible piping system to a jet lance and is directed against a surface to be treated in a blast chamber maintained under subatmospheric pressure and is from there returned in an air stream, cleaned and optionally fed in a circulating path whereby the acceleration of the blast medium is produced by the subatmospheric pressure and the blast chamber is shifted from one surface to be treated to another surface to be treated.

The invention also relates to a device for carrying out the method and having at least one receptacle for holding in readiness a blast medium, a metering and/or injector device connected to the receptacle for dosing the blast medium into a subatmospheric pressure air stream produced by a suction apparatus, a flexible tubing line connected with the metering and/or injector device for transporting the air stream containing the blast agent into a blast chamber maintained at subatmospheric pressure by means of a blast lance with nozzles for causing the blast medium to impinge on the surface to be treated and a flexible pipe discharge connected to the blast chamber for drafting off under suction the blast agent and the particles removed from the treated surface from the blast chamber into a separating vessel and a filter which connects the separating vessel with the suction unit.

BACKGROUND OF THE INVENTION

In DE 197 47 838 A1, a method is described for the dry removal of coatings, graffiti or other surface contaminants from planar or curved surfaces. An abrasive or similar blast medium is supplied to a carrier air stream passed through a flexible piping system, is accelerated and is thrown against the surface to be treated.

The blast medium is then returned by a subatmospheric pressure of 50 to 300 mbar in the carrier air stream, is cleaned in a cleaning unit and is metered anew into the carrier air stream so that a circulation is obtained. The blast medium/air mixture is, before impinging on the surface to be treated, subjected to a linear acceleration to a jet speed of 20 to 80 m/s whereby the acceleration is obtained by a reduction in the diameter from the feed line stretch to the accelerating stretch.

The jet velocity which is achieved by means of this diameter reduction is indeed sufficient for the removal of graffiti or other surface contaminants by an abrasive effect. For the removal or leveling of harder surfaces, like for example solder and weld seams, however, the jet velocity which is produced is too low so that the known method is uneconomical. This applies also to the descaling of metallic surfaces or the removal of contaminated concrete layers.

The energy input achieved in accordance with DE 197 47 838 A1 is, on the other hand, much too high when point-like inclusions in a paint layer are to be removed. Multilayer paint layers are, as is known, up to 150 $\mu$m thick and are comprised, from the outside inwardly of a clear lacquer and a base lacquer layer, a filler and a primer layer. Especially in the case of metallic lacquering of automobile body parts, defect locations can arise in the application of the paint which above all have their origins in point-like or flat inclusions in the clear lacquer or base lacquer layer. These defects can give rise to the need for expensive and costly processing because the diameter reduction enables only a limited control of the jet speed so that on the one hand with an impingement energy which is selected to be too high, the entire lacquer layer is damaged or affected while on the other hand with too small an impingement energy the treatment is uneconomical.

OBJECT OF THE INVENTION

The invention has as its object to so improve a method and an apparatus of the kind described at the outset that the jet velocity is significantly increased and in spite of that increase in jet velocity, the amount of energy with which the blast medium encounters the surface to be treated can be economically adjusted for different fields of use within wide limits for a reduced energy input and with greater flexibility and ecological recovery and reuse of the blast agent.

SUMMARY OF THE INVENTION

This object is achieved with a method of sandblasting solid surfaces, especially for an exact-shape removal of material and/or compaction and/or coating, for example the removal of paint defects from lacquers, the smoothing of solder and solid seams, removal of contaminated concrete layers or rust layers, solidifying, leveling or coating of metallic surfaces, in which a sandblasting agent is metered into a carrier airstream generated by a subatmospheric pressure by means of gravity and/or an injector effect, is conveyed to a jet lance in a flexible piping system and is directed through a blast chamber set on a surface to be treated and maintained under a subatmospheric pressure and from there is returned in the airstream, cleaned and optionally fed in a circulating path.

According to the invention the acceleration of the sandblasting agent is produced by the suction pressure and the blast chamber is shifted from surface to be treated to surface to be treated.

The sandblasting agent is given at least an additional energy pulse by at least one further gas stream at atmospheric pressure other than that which is drawn by suction at subatmospheric pressure to reach an end velocity upstream from the metering location whereby the energy input to the surface to be treated is adjusted as a function of the nature and shape of the surface to be treated as parameters and the sandblasting agent, the degree in which the carrier air is charged with the sandblasting agent, the subatmospheric pressure in the carrier airstream, the sandblasting duration and the sandblasting temperature.

The apparatus of the invention comprises at least one vessel for holding a supply of the sandblasting agent, a metering and/or injector device connected to the vessel for metering the sandblasting agent into a subatmospheric pressure airstream produced by a suction device, a flexible pipeline connected with the metering and/or injector device for transporting the sandblasting agent/airstream to a jet lance extending into a blast chamber under subatmospheric pressure and having nozzles for treating the surface to be treated and a flexible pipeline connected to the blast chamber for sucking off the sandblasting agent and particles removed thereby from the blast chamber and a filter connected with the suction unit.

According to the invention the jet lance is provided upstream of its entry into the blast chamber and upstream of the metering and/or injector device with the flexible pipeline by means of which a further injector produces an additional energy pulse and supplies it by suction through at least a gas stream which is at least under atmospheric pressure to the sandblasting agent.

Thus the method according to the invention is characterized above all in that the speed of the blast agent is controllable as a function of the type and shape of the surface to be treated and the blast agent, in dependence upon the degree to which the carrier or stream is charged with the blast agent, in dependence upon the subatmospheric pressure of the carrier or stream, in dependence upon the jet impingement duration and jet temperature within wide limits, especially between>80 and 1000 m/s. The method of the invention can be used for the removal of defects from lacquers, for the smoothing and leveling of solder seams or for example for the removal of contaminated concrete layers or for the compacting or coating of surfaces uniformly.

The apparatus according to the invention for carrying out the method is simple but, however, also of strong construction.

It can operate with a carrier air stream of 0.1 m³/h to 5000 m³/h.

Advantageously the further gas stream is subdivided into individual partial streams and is supplied coaxially to the flow direction after a constriction in the flow cross section in the jet lance to the carrier airstream. The subatmospheric pressure can be set to>150 to 1000 mbar, preferably 400 to 700 mbar and the sandblasting agent can be adjusted to a final speed of>80 to 1000 m/s, preferably 150 to 330 m/s. For the gas stream atmospheric air or a protective gas, especially an inert gas can be used. The carrier airstream can amount to 0.1 m³/h to 5000 m³/h. The energy input into the surface to be treated is controlled additionally by a periodic pulse drive for metering and for the sandblasting duration.

The metering and the sandblasting duration can be controlled with a metering device having a timing relay.

The carrier airstream charged with the sandblasting agent can be distributed, before reaching the surface to be treated, into separate partial streams, each of these partial streams being supplied with an energy pulse and all of the partial streams being simultaneously applied over the surface to be treated in a fan-like manner.

The sandblasting agent, broken glass, corundum, zirconium sand, fine-grained slag or steel particles or mixtures thereof can be used for removal from the treated surface.

The sandblasting agent can be a ball-shaped granulate of glass, steel, cast steel, ceramic, corundum or their mixtures with a particle size of 5 to 5000 μm is used for compaction.

As the sandblasting agent metal particles, especially zinc, lead, tin, aluminum, magnesium or other alloys can be used.

BRIEF DESCRIPTION OF THE DRAWING

Further advantages and details will be apparent from the subsequent description reference being made to the accompanying drawing.

In the drawing.

SPECIFIC DESCRIPTION

Figure 1:
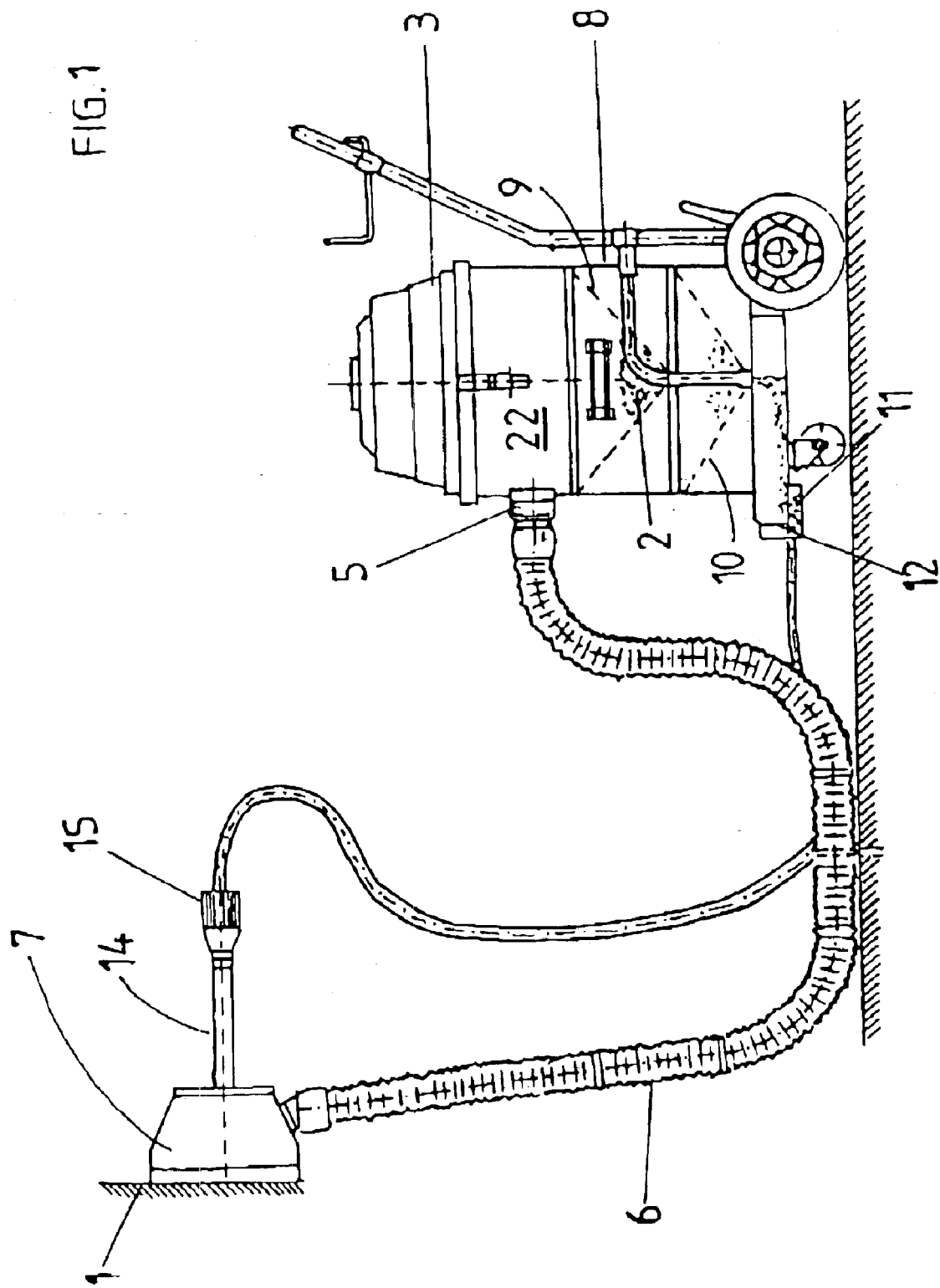
FIG. 1 is a function diagram illustrating the method according to the invention.

FIG. 1 shows the functional diagram illustrating the principles of the method according to the invention for the sandblast treatment of a planar surface 1 to be treated and which is vertical, with a blast agent 2. As the blast agent 2, glass particles, corundum, zirconium sand, fine-grained slag or steel particles can be used.

With a suction unit 3, a carrier air stream 4 is produced with an air flow of 0.1 m³/h to 5000 m³/h. The suction fitting 5 of the suction unit 3 a subatmospheric pressure>150 to up 1000 mbar is generated. In the receptacle 8 there are to be found two bulk funnels 9 and 10 located vertically one above the other and which are pneumatically separated from one another. The blast medium 2 passes by gravity from the bulk funnel 9 into the bulk funnel 10 and from there into a metering device 11 with a horizontally disposed dosing injector 12 which is connected with the feed hose 13. Through the subatmospheric pressure which is generated, the blast medium 2 is sucked into the machine and is drawn through the flexible hose 13 together with the carrier air stream which flows to a jet lance 14 which extends into the blast chamber 7. From the blast chamber 7 the blast agent-air-removed particle mixture is fed via the return hose 6 to a separator or cyclone 22 which effects a separation of the blast agent from the carrier air stream before it is fed to a filter which separates out the removed particles from the carrier air stream and permits the latter to pass to the suction unit 3.

Figure 2:
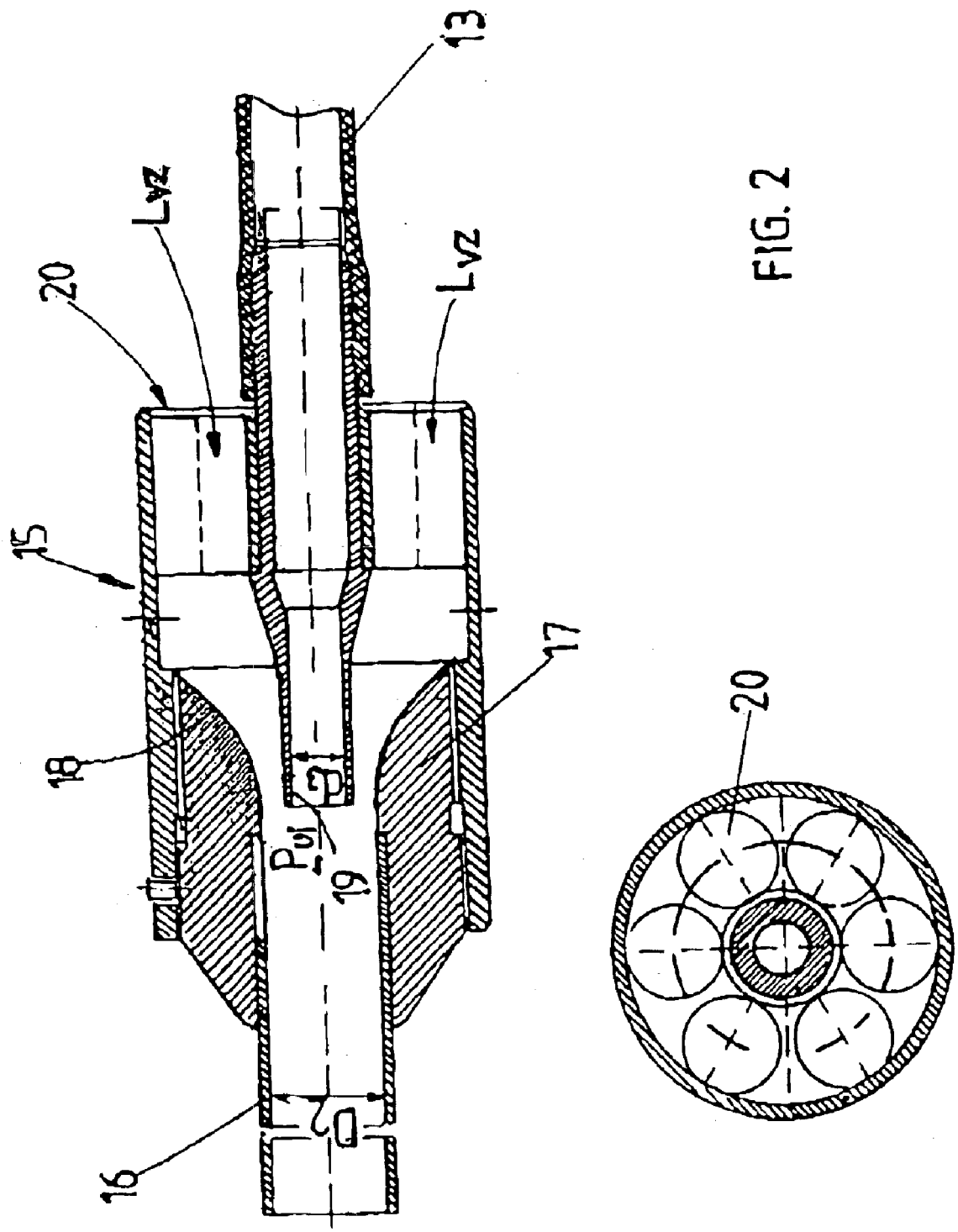
FIG. 2 is a cross section through the injector in the flexible piping.

FIG. 2 shows a section through the injector 15 which is received in the hose 13 and whose mixing tube 16 extends into the blast chamber 7. The injector 15 is comprised of a nozzle body 17 with a conically narrowing inlet opening extending into the mixing tube 16. The end 19 of the hose 13 is arranged centrally on the nozzle body axis A—A and terminates in the region of the greatest cross section reduction of the nozzle body 17. Coaxial with the hose line 13 are suction openings of a suction ring 20 which are arranged for the intake of atmospheric air. The mixing tube 16 has a diameter $D_2$ which is about twice the diameter $d_3$ of the end 19 of the hose line 13 so that the air stream $L_{VZ}$ fed via the suction ring generates a subatmospheric pressure $P_{VI}$ which sucks in air through the openings 20 for addition to the carrier air-blast medium mixture of hose line 13 and accelerates it.

The air stream $L_{VZ}$ is the effect of applying a velocity increasing energy pulse to the suction air-blast medium mixture. As a result a jet velocity of up to 1000 m/s can be achieved.

Depending upon the material of the surface to be treated and the kind and shape of the blast agent, by regulation of the air quantity $L_{VZ}$, the variation of the applied suction, the blast duration, the blast temperature and the geometric ratio at the injector 20, treatment conditions which are applicable can be adjusted. All substantial components of the apparatus according to the invention can be assembled based upon the application of the apparatus in a modular manner.

EXAMPLE 1

Figure 3:
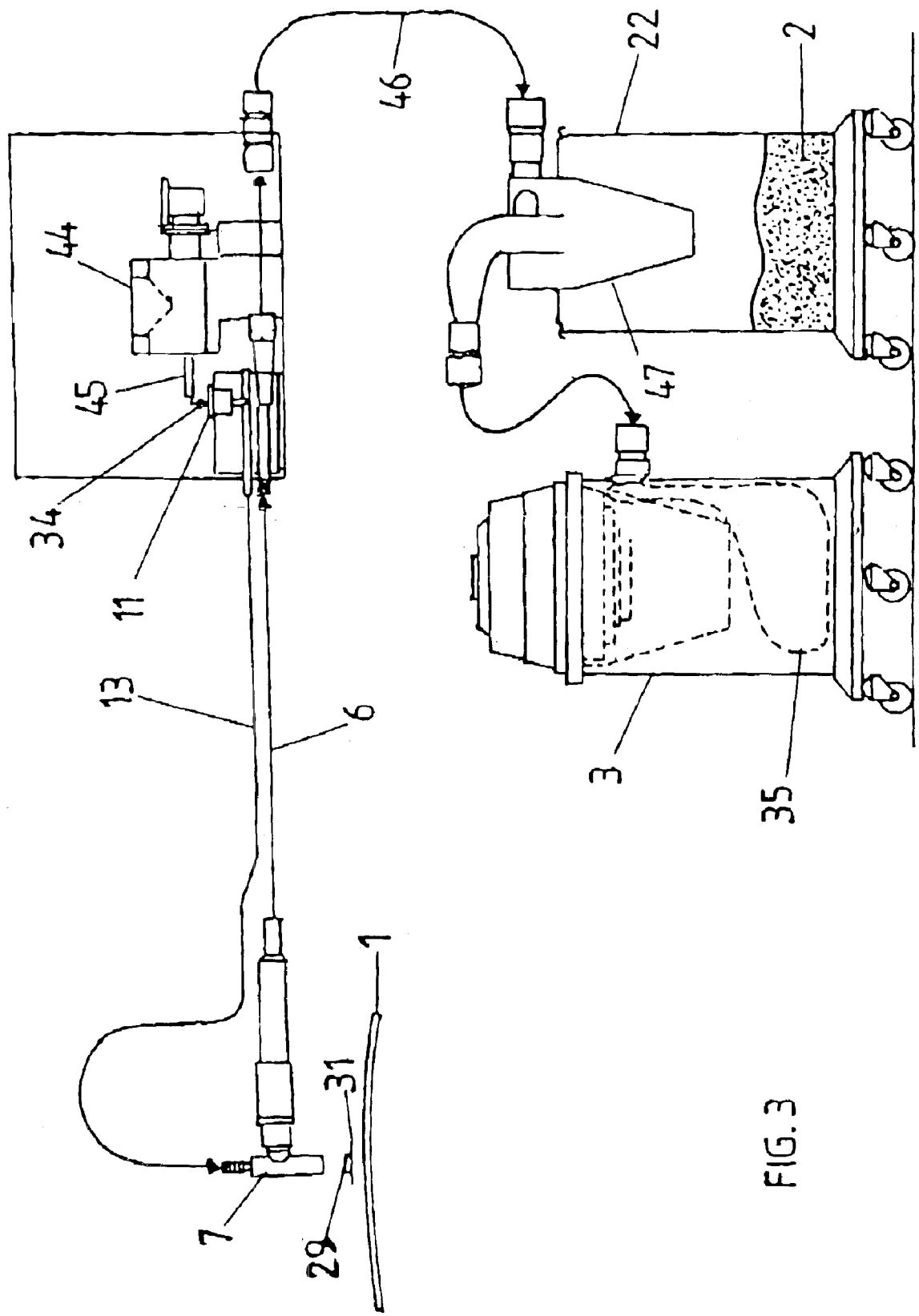
FIG. 3 is a diagram showing the principles of an apparatus according to the invention for the removal of point-like defects in lacquer layers.

From a lacquering or painting of an automobile body part, defects are to be removed by the method according to the invention. FIG. 3 shows a variant of the apparatus according to the invention with which the method according to the invention is carried out.

The apparatus of FIG. 3 comprises substantially a blast chamber 7 having a blast lance 14 arranged therein, a metering worm 11 which is connected with the jet lance 14 by a flexible hose 13, a supply vessel 44 or the blast agent 2 which is connected with the metering worm 11 by means of a charging duct 45, a suction fitting 21 which at one end opens into the blast chamber 7 and at its opposite end via a hose 6 extends to a separator 22, and a suction unit 3 whose suction side is connected with the latter.

Figure 4:
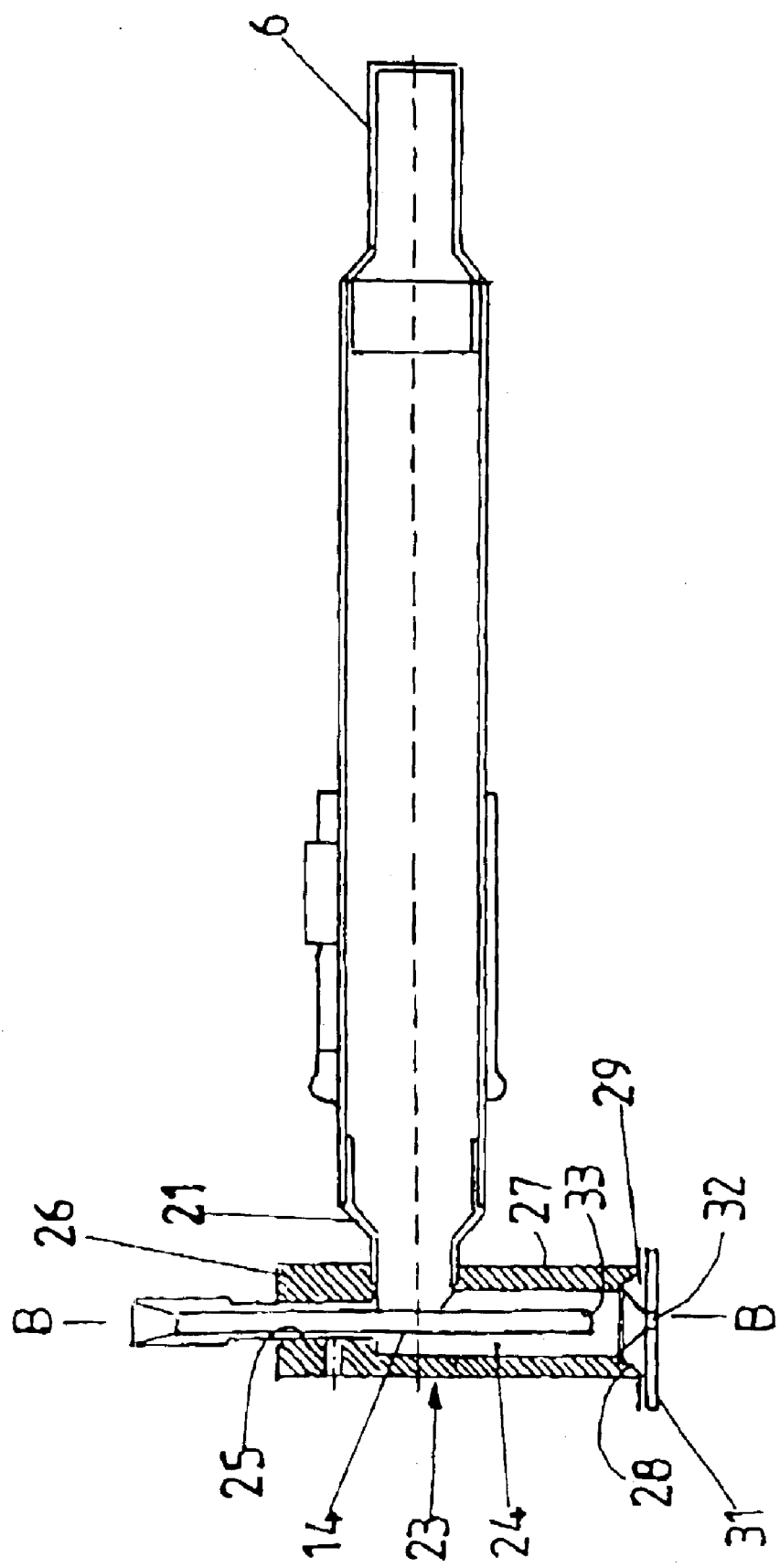
FIG. 4 is an elevational view of the jet chamber, jet lance, jet diaphragm and magnetic foil in accordance with FIG. 3.

The blast chamber 7 is, as FIG. 4 shows, formed from a cylindrical sleeve body 23 which has an inner receiving space 24. In the inner receiving space a thin jet lance 14 can be shoved into the cylindrical sleeve body 23 along the sleeve axis B—B through a bore 25 in the upper sleeve wall 26 and can be clampingly held in this bore by means of a screw.

The end of the sleeve body 23 opposite the upper sleeve wall 26 is open and has a recess 28 machined into the sleeve wall 27 and in which a diaphragm body 29 can be inserted. The diaphragm body 29 closes the receiving space 24 of the sleeve body 23. In the diaphragm body 29 a circular opening 30 is machined which widens conically inwardly in a funnel shape manner. The diaphragm body 29 is comprised of a wear-resistant material which is formed on an outer side with a magnetic foil 31. Advantageously the magnetic foil 31 is adhesively arranged to the diaphragm body 29 and also has an opening 32 which corresponds in its position with that of the opening 30 of the diaphragm body 29.

The jet lance 14 is shoved into the receiving space 24 to such an extent that the outlet opening 33 of the jet lance 14 reaches close to the opening 30 of the diaphragm body 29.

The suction fitting 21 opens somewhat below the upper housing wall 26 at a sufficient distance from the outlet opening 33 of the jet lance 14 in the sleeve body 23.

The drive of the metering worm 11 can be cut out by a timing relay 34. The metering worm 11 thus feeds the blast medium from the vessel 44 until the timing relay 34 shuts down further operations of the drive.

The method of the invention proceeds as follows. On several painted sheet metal samples, the sandblasting duration and sandblasting quantity of the blast agent are determined as measures for the requisite energy input required at the defect location on a layer thickness determination basis for example to remove the clear lacquer layer and the basic lacquer layer up to the filler. The switching time of the timing relay 34 of the metering worm is set for this determined duration and the previously determined quantity of the blast agent is gated into the carrier air stream.

For a metallic lacquering of about 18 µm primer layer, 25 µm filler, 12 µm lacquer base and 35 µm clear lacquer, a switching time of 14 seconds and a blast agent quantity of 7 grams at a particle size of 80 µm have been found to be advantageous.

Upon termination of the switching time, the timing relay 34 cuts off the metering worm 11. There is no further gating of the blast agent into the carrier air stream generated by the suction unit 3 which is maintained while the metering worm 11 is at standstill and the blast agent which has been used is transported through the clean line 46 into the separator 22. Within the separator 22 a cyclone 47 separates the blast agent 2 from the removed lacquer which is picked up in the filter 35 of the suction unit 3.

Then the blast result is visually checked and the determination made whether the inclusion has been removed from the lacquer layer. If this is not the case, the metering worm 11 is turned on again. The metering worm then feeds additional blast agent into the carrier stream until the timing relay 34 shuts down the metering worm 11.

By varying the blast material, the sandblasting duration and the quantity of the sandblasting material used it is possible to precisely adjust the energy input required and the metering for the removal of the inclusion from the lacquer layer.

EXAMPLE 2

Figure 5:
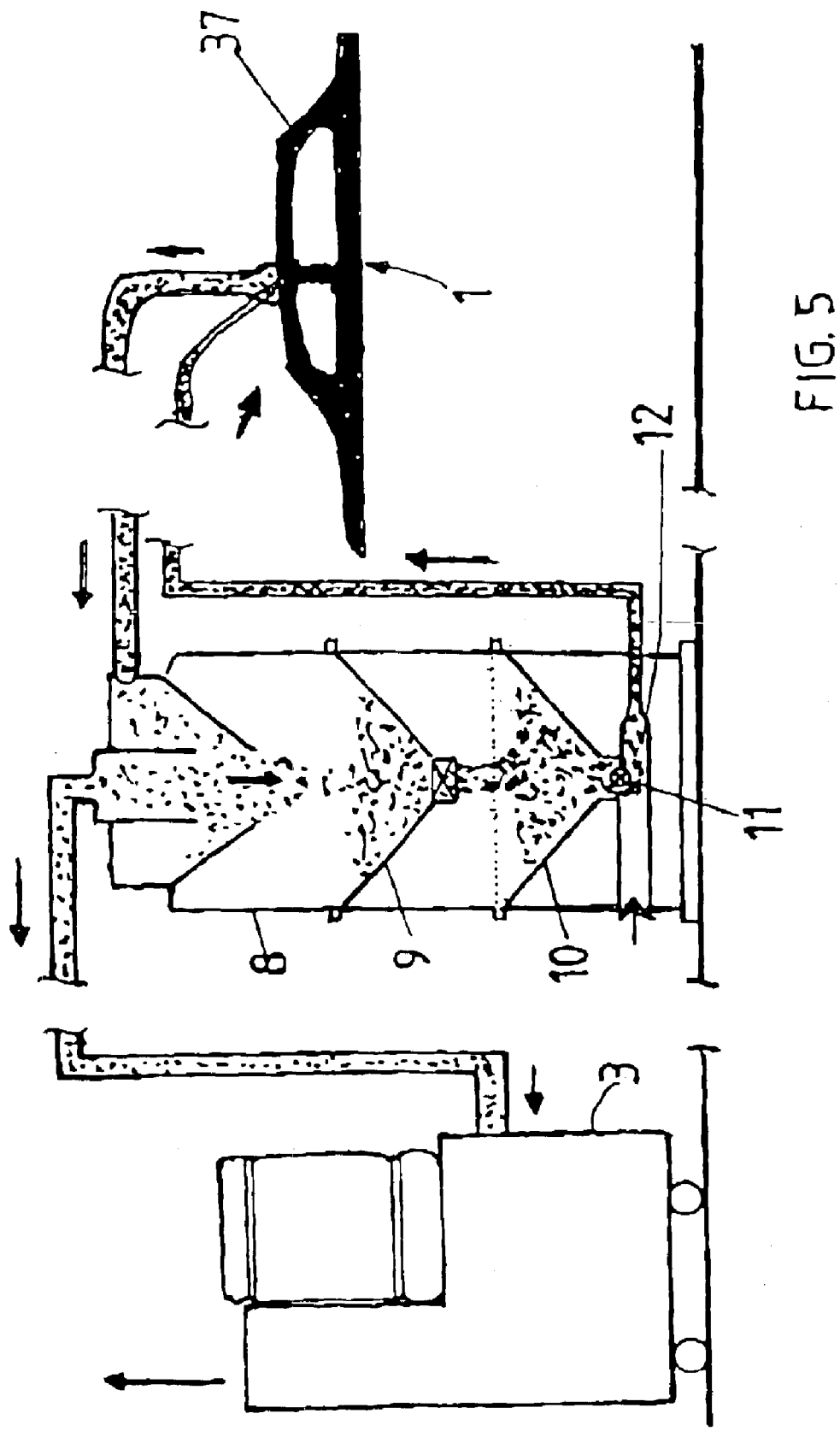
FIG. 5 is a diagram showing the principles of an apparatus according to the invention for the smoothing of solder seams.

With the method of the invention, a solder seam 36 is leveled [planed] and smoothed between two bent sheet metal plates 48. FIG. 5 shows an apparatus according to the invention for the smoothing such solder seams and which in its construction corresponds to the previously described system construction.

Figure 6:
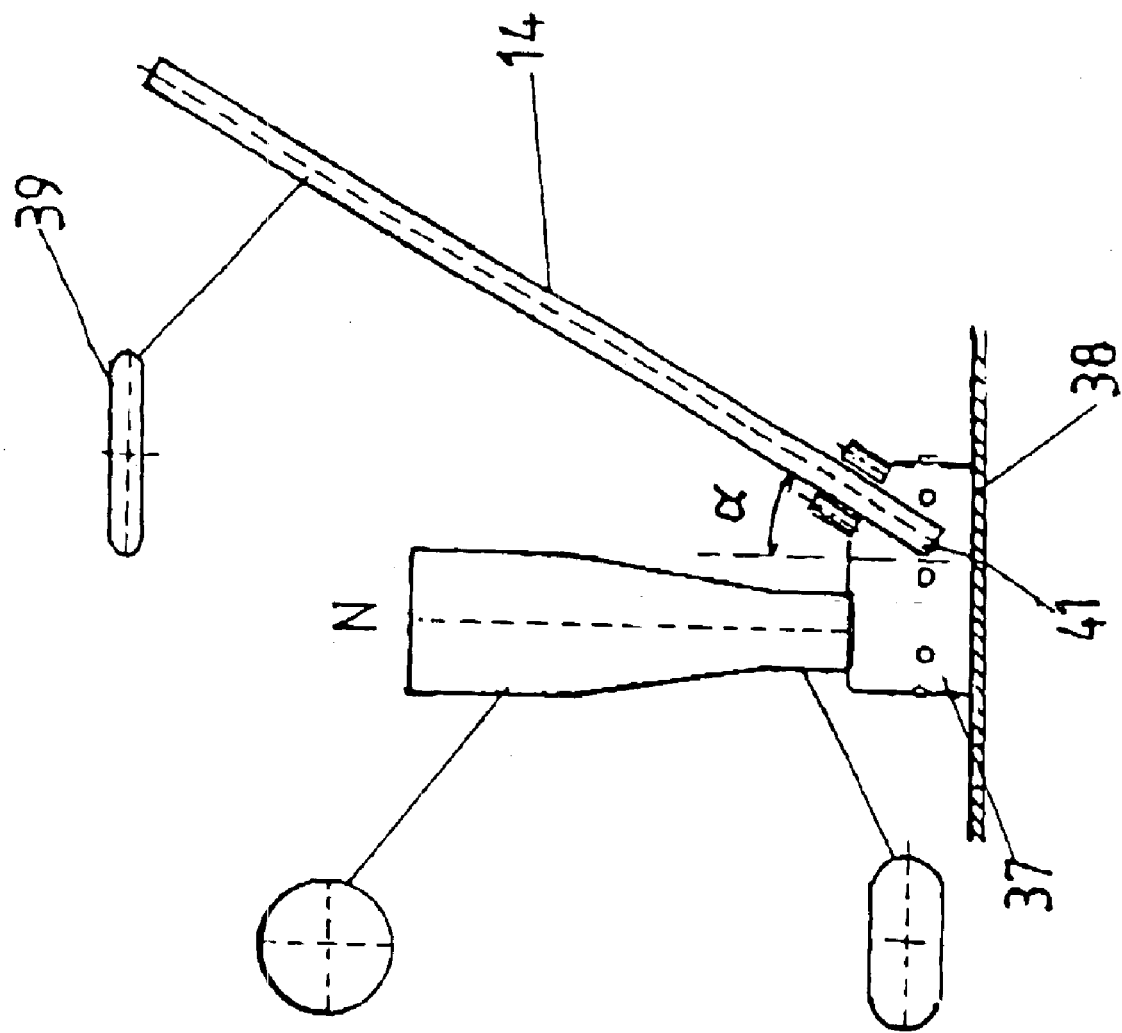
FIG. 6 is an elevational view of the blast chamber, jet lance and mask according to FIG. 5.

In FIG. 6 the blast chamber 7 has been shown which comprises a body 37 which can be set upon the surfaces to be treated of the solder seam 36, a jet lance 14 which extends in the body 37 up to close to the solder seam 36 at an angle a to a normal N of the surface of the solder seam 36, a mask 38 which closes the body 37 and has an outlet opening 39 for the sandblasting medium which corresponds to the solder seam and is gap shaped, and a suction fitting widening in a funnel shape. The jet lance 14 has a gap shaped end 41 whose longitudinal dimension corresponds generally to the longitudinal dimension of the surface to be treated of the solder seam 36. This ensures that the entire surface to be treated of the solder seam 36 is simultaneously treated with the sandblasting agent. The jet lance 14 is, as has been described previously, connected with the hose 13 in which the previously described additional injector 15 is arranged.

Figure 7:
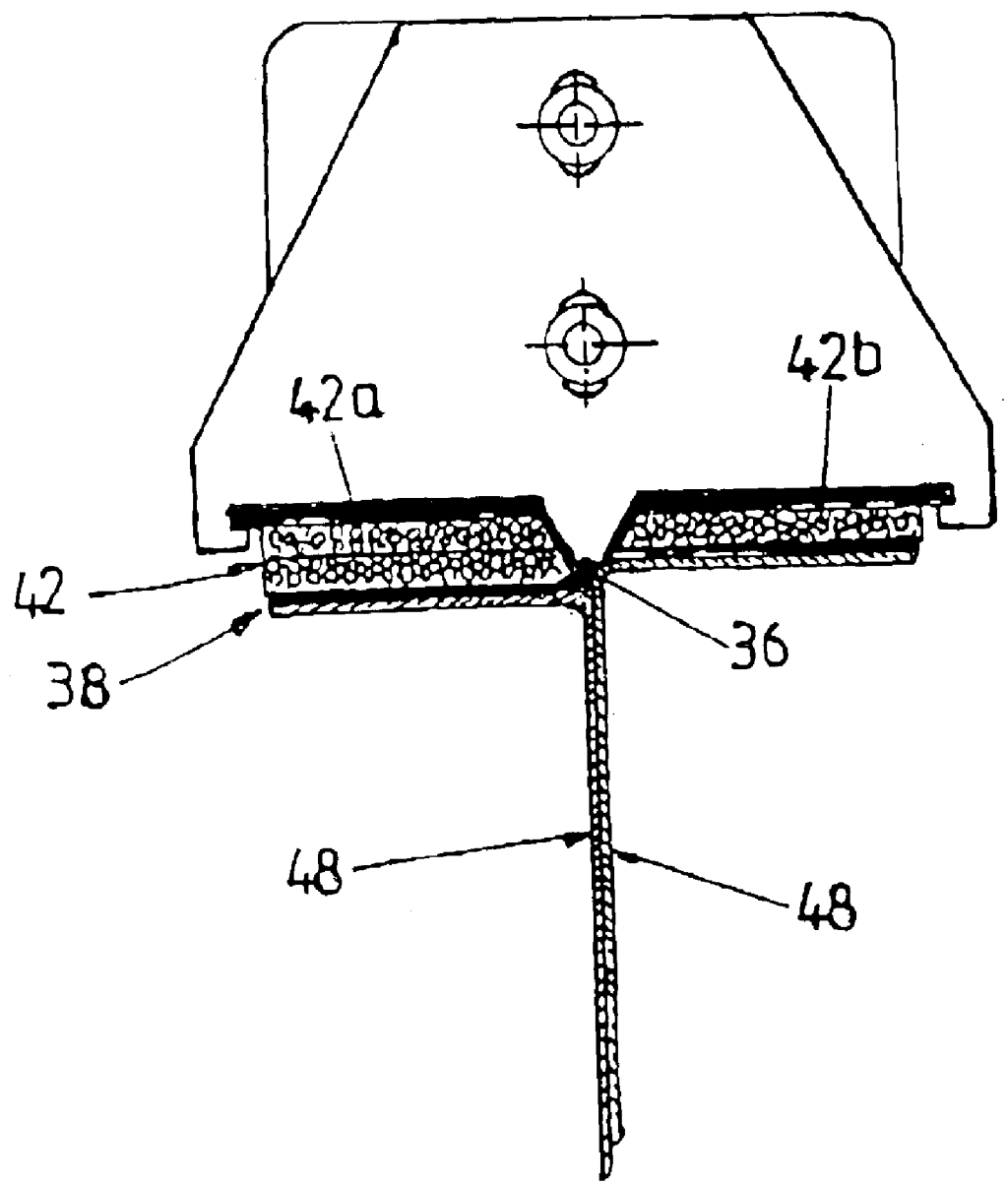
FIG. 7 is a section through two metal parts having connecting solder seams with the jet chamber applied thereto.

The covering mask 38 is fixed to a foam rubber layer 42 which, in this example, is bipartite so that the height difference in the junction region of the sheet metal edges bridged by the solder seam 36 can be compensated (see FIG. 7). For this purpose the two parts 42a and 42b of the foam rubber layer 42 have different thicknesses. The foam rubber layer 42 is fixed on the sheet metal parts by a magnetic foil so that the shifting of the head in a problemless manner along the solder seam is possible. Naturally the mask can be fixed in place also by mechanically applied forces by a vacuum or by adhesion.

The foam rubber layer 42 as a wear layer ensures the largely air-tight closure of the blast chamber 7 whereby unevenness is covered.

In this example the method according to the invention operates with a suction pressure of 320 mbar, a carrier airstream flow of 180 $M^3$/h and with a sandblasting speed of about 180 m/s.

EXAMPLE 3

A contaminated concrete layer from a concrete surface is removed by the method according to the invention. The construction of the apparatus according to the invention corresponds to that has been described previously in principle. The airstream generated by the suction unit 3 of about 3000 to 5000 m³/h is distributed to a multiplicity of jet lances 14 oriented with respect to one another in a fan-like pattern and supplied with respective separate hoses 13. Each of the hoses 13 is provided with an injector 15 which impart an additional energy pulse to the carrier air flow/sandblasting agent mixture for significant increase in the blast velocity. All of the jet lances 14 are arraigned in a common blast chamber 7 which can be shifted on the concrete surface. The suction unit 3 produces a suction pressure of 400 to 500 mbar and blast velocity of about 300 m/s can be reached.

The sandblasting agent-concrete particle mixture passes over the hose 6 into the separator 22 where the sandblasting agent is separated off, filtered and fed again to the closed circulation.

In a fine filter, the sandblasting agent is separated from the removed concrete particles. The carrier airstream thus enters in a clean state the suction unit 3.

With the method according to the invention, surface removal rates of 4.6 m²/h with a removal thickness of 10 mm can be reached.

The removal thickness can be so adjusted by the method according to the invention that only the amount of concrete which is required is removed from a contaminated concrete layer.

This ensures that only a limited amount of concrete must be removed or results as a waste product.

EXAMPLE 4

A surface is to be compacted with the method according to the invention. For this purpose the method of the invention is carried out as previously described. The sandblasting medium is comprised of steel which, upon impingement of the surface compacts it and thus effects surface hardening.

The sandblasting agent depends upon the type of substrate which is to be compacted and can be ball-shaped steel particles with diameters between 50 $\mu$m and 5000 $\mu$m. The jet velocity lies at about 250 m/s.

EXAMPLE 5

A surface previously compacted in accordance with Example 4 has a zinc coating applied by the method of the invention. As the sandblasting medium, zinc particles with a particle size of 20 $\mu$M is used. These particles are accelerated in an injector 15 to a velocity of 180 m/s. Upon impingement of the zinc particles on the surface, the movement energy of the particles is transformed into heat energy which suffices to bond a zinc coating to the treated surface.

PRESENTATION OF THE REFERENCE CHARACTERS USED

Treated surface 1
Sandblasting agent 2
Suction unit 3
Carrier airstream 4
Suction fitting 5
Hose 6
Blast chamber 7
Vessel 8
Bulk funnel in 8 9, 10
Metering device, metering worm 11
Metering injector 12
Hose 13
Jet lance 14
Injector 15
Mixing tube 16
Nozzle body of 15 17
Inlet opening 18
End of the hose 13 19
Suction ring with suction opening 20
Suction fitting 21
Separator cyclone 22
Cylindrical sleeve body 23
Inner receiving space of 23 24
Upper sleeve wall 25
Bore 26
Sleeve wall 27
Recess 28
Diaphragm body 29
Opening 30
Magnetic foil 31
Opening in 31 32
Outlet opening in 14 33
Timing Relay 34
Filter 35
Solder seam 36
Body of 7 37
Covering mask 38
Outlet opening in 38 39
Suction fitting 40
End of 14 41
Wear layer, foam rubber layer 42
Parts of 42 42a, 42b
Divided metal foil 43
Supply vessel for blast agent 44
Charging pipe 45
Suction pipe 46
Cyclone in separator 47
Nozzle body axis A—A
Sleeve body axis B—B
Diameter of mixing tube d2
Diameter of end of the hose d3
Normal to the treated surface N
Additional suction pressure in injector 15 $P_{VI}$
Angle of the jet lance $\mu$

What is claimed is:

1. A method of treating a solid surface by impingement of a particulate stream thereagainst, especially for removal of material and/or compaction and/or coating, for example the removal of paint defects from lacquers, the smoothing of solder and solid seams, removal of contaminated concrete layers or rust layers, solidifying, leveling or coating of metallic surfaces, in which a particulate agent is metered into a carrier airstream generated by a subatmospheric pressure by means of gravity and/or an injector effect, is conveyed to a jet lance in a flexible piping system and is directed through a blast chamber set on a surface to be treated and maintained under a subatmospheric pressure and from there is returned in the air-stream, cleaned and optionally fed in a circulating path, whereby the acceleration of the agent is produced by the suction pressure and the blast chamber is shifted from surface to be treated to surface to be treated, wherein the agent is given at least an additional energy pulse by at least one further gas stream at atmospheric pressure other than that which is drawn in by suction at subatmospheric pressure to reach an end velocity considerably greater upon impingement against said surface than the carrier airstream velocity upstream from the metering location whereby the energy input to the surface to be treated is adjusted with a function of the nature and shape of the surface to be treated as parameters and the nature of the agent, the degree in which the carrier air stream is charged with the agent, the subatmospheric pressure, the treatment duration and the treatment temperature.

2. A method of treating a solid surface by impingement of a particulate stream thereagainst, especially for removal of material and/or compaction and/or coating, for example the removal of paint defects from lacquers, the smoothing of solder and solid seams, removal of contaminated concrete layers or rust layers, solidifying, leveling or coating of metallic surfaces, in which a particulate agent is metered into a carrier airstream generated by a subatmospheric pressure by means of gravity and/or an injector effect, is conveyed to a jet lance in a flexible piping system and is directed through a blast chamber set on a surface to be treated and maintained under a subatmospheric pressure and from there is returned in the air-stream, cleaned and optionally fed in a circulating path, whereby the acceleration of the agent is produced by the suction pressure and the blast chamber is shifted from surface to be treated to surface to be treated, wherein the agent is given at least an additional energy pulse by at least one further gas stream at atmospheric pressure other than that which is drawn in by suction at subatmospheric pressure to reach an end velocity considerably greater upon impingement against said surface than the carrier airstream velocity upstream from the metering location whereby the energy input to the surface to be treated is adjusted with a function of the nature and shape of the surface to be treated as parameters and the nature of the agent, the degree in which the carrier air stream is charged with the agent, the subatmospheric pressure, the treatment duration and the treatment temperature, the further gas stream being subdivided into individual partial streams and being supplied coaxially to the flow direction after a constriction in the flow cross section in the jet lance to the carrier airstream.

3. The method according to claim 1 wherein the subatmospheric pressure is set to 150 to 1000 mbar and that the particulate agent is adjusted to a final speed of>80 to 1000 m/s.

4. The method according to claim 1 wherein the gas stream is atmospheric air or a protective gas.

5. The method according to claim 1 wherein the carrier airstream amounts to 0.1 $m^3$/h to 5000 $m^3$/h.

6. The method according to claim 1 wherein the energy input into the surface to be treated is controlled additionally by a periodic pulse drive for metering and for the treatment duration.

7. The method according to claim 6 wherein the metering and the treatment duration are controlled with a metering device having a timing relay.

8. The method according to claim 1 wherein the carrier airstream charged with the particulate agent is distributed, before reaching the surface to be treated, into separate partial streams, each of these partial streams is supplied with an energy pulse and all of the partial streams are simultaneously applied over the surface to be treated in a fan-like manner.

9. The method according to claim 1 wherein the particulate agent, broken glass, corundum, zirconium sand, fine-grained slag or steel particles or mixtures thereof are used for removal from the treated surface.

10. The method according to claim 1 wherein the particulate agent is a ball-shaped granulate of glass, steel, cast steel, ceramic, corundum or mixtures thereof with a particle size of 5 to 5000 $\mu$m is used for compaction.

11. The method according to claim 1 the particulate agent is metal particles of zinc, lead, tin, aluminum, magnesium or other alloys.

12. An apparatus for treating a surface which comprises at least one vessel for holding a supply of a particulate agent, a metering and/or injector device connected to the vessel for metering the particulate agent into a subatmospheric pressure airstream produced by a suction device, a flexible pipeline connected with the metering and/or injector device for transporting the particulate agent/airstream to a jet lance extending into a blast chamber under subatmospheric pressure and having nozzles for treating the surface to be treated and a flexible pipeline connected to the blast chamber for sucking off the particulate agent and particles removed thereby from the blast chamber and a filter connected with the auction unit, the jet lance being provided upstream of its entry into the blast chamber and upstream of the metering and/or injector device with the flexible pipeline by means of which a further injector produces an additional energy pulse and supplies it by suction through at least a gas stream which is at least under atmospheric pressure to the particulate agent, wherein the jet lance has a suction ring arranged coaxially with the hose and having a suction opening and is provided with an inwardly lying nozzle body having a cross section reduction and formed with a mixing tube in which the end of the hose extends centrally along a nozzle body axis to the region of the maximum cross section reduction of the nozzle body wherein the ratio of the inner diameter of hose and nozzle body being 1 to 1000.

13. The apparatus according to claim 12 wherein the blast chamber is formed from a sleeve body in which the jet lance extends in the direction of the sleeve axis close to a diaphragm body closing the end of the sleeve body and which has an outlet opening registering with the jet lance which widens in the interior of the sleeve body and which has a reduced cross section whereby the diaphragm body (29) is so held on the surface (1) to be treated that the outlet opening coincides with the position of the working point and that the outlet hose is arranged perpendicular to an axial direction of the sleeve above the outlet opening.

14. The apparatus according to claim 13 wherein the outlet opening in the diaphragm body has a cross section of 1 to 20 $mm^2$.

15. The apparatus according to claim 14 wherein the outlet opening widens inwardly in a funnel shape.

16. The apparatus according to claim 15 wherein the angle of the outlet opening in the diaphragm body amounts to 90°.

17. The apparatus according to claim 13 wherein the diaphragm body is comprised of a wear-resistant material in the form of a ceramic or steel.

18. The apparatus according to claim 17 wherein the diaphragm body is removably received in an opening at the end.

19. The apparatus according to claim 13 wherein the diaphragm body is held by a magnetic foil to the surface to be treated.

20. The apparatus according to claim 13 wherein the diaphragm body is held by vacuum or mechanical forces to the surface to be treated.

21. The apparatus according to claim 13 wherein the diaphragm body is held by adhesion in the form of adhesive bonding to the surface to be treated.

22. The apparatus according to claim 13 wherein the metering device is a worm which is connected with a timing relay for turning on or shutting off the metering device.

23. The apparatus according to claim 12 wherein the blast chamber is formed from a square shaped body which can be placed upon the surface to be treated in which the jet lance is disposed at an angle of 5 to 179° to a normal of the surface to be treated and extends close to a mask covering the surface to be treated and having a slit-shaped opening corresponding to the treated area, the body having an outlet opening which extends over the opening and the suction opening of the discharge hose is arranged in the surface normal above the surface to be treated.

24. The apparatus according to claim 23 wherein the mask is disposed on a wear layer which in turn is held by vacuum, mechanically effected forces, magnetic forces or adhesion on the surface to be treated.

25. The apparatus according to claim 24 wherein the wear layer limits the treatment area.

26. The apparatus according to claim 24 wherein the wear layer is bipartite whereby, its parts are arranged along the opening.

27. The apparatus according to claim 24 wherein the parts of the wear layer have different thicknesses.

28. The apparatus according to claim 24 wherein the wear layer is comprised of foam rubber.

* * * * *